United States Patent [19]

Cordi et al.

[11] 3,898,444

[45] Aug. 5, 1975

[54] BINARY COUNTER WITH ERROR DETECTION AND TRANSIENT ERROR CORRECTION

[75] Inventors: Vincent A. Cordi, Vestal; Chester S. Gurski, Endwell, both of N.Y.

[73] Assignee: IBM Corporation, Armonk, N.Y.

[22] Filed: Dec. 28, 1973

[21] Appl. No.: 429,447

[52] U.S. Cl. .................... 235/153 AP; 235/92 EC

[51] Int. Cl.[2] .................... H03K 21/34

[58] Field of Search .................... 235/153 AP, 92 EC

[56] References Cited

UNITED STATES PATENTS

| | | | |
|---|---|---|---|
| 2,996,248 | 8/1961 | Abbott, Jr. | 235/153 AP |
| 3,155,939 | 11/1964 | Vadus | 235/153 AP |

FOREIGN PATENTS OR APPLICATIONS

| | | | |
|---|---|---|---|
| 915,776 | 1/1963 | United Kingdom | 235/153 AP |

*Primary Examiner*—David H. Malzahn

*Attorney, Agent, or Firm*—James E. Murray

[57] ABSTRACT

This specification discloses a binary counter with two channels each consisting of a binary counter with ripple carry. Both channels store the same binary number, and to advance the count, a pulse is first applied to the input to one counter and thereafter applied to the input of the other counter. The output of each stage in one counter is Exclusive Ored with the output of the same stage in the other counter. The results of this Exclusive ORing is analyzed with additional logic circuitry to determine if the counts in the two channels are or are not equal. If they are not equal the analysis determines which of the counters contains the higher count, and if the difference in the counts is greater than one. This information is then used to find which of the channels is in error and whether the error is a transient error or an error resulting from a hard failure in one of the channels.

5 Claims, 4 Drawing Figures

BINARY COUNTER WITH ERROR DETECTION AND TRANSIENT ERROR CORRECTION

BACKGROUND OF THE INVENTION

The present invention relates to binary counters more particularly to binary counters with an error detection and correction capability.

Large binary counters are utilized in many applications wherein undetected failures may be disastrous and even detected, but uncorrected failures may result in a significant performance degradation. Once such application would be to provide a unique and non-reusable identifier to identify each segment of allocated memory space in a virtual memory system with a unique virtual memory address. Since each address must be unique, it is important that any error that did occur does not reduce the count of the counter, since this would result in assignment of the same virtual memory address for two different segments of memory space in the virtual memory system. This, of course, would jeopardize the integrity of the memory system, possibly with disastrous results. An error resulting in higher count in the counter may not be catastrophic, but if large enough or if it should reoccur repetitively it could appreciably decrease the life of the counter. For this reason it is most desirable to devise a mechanism for detecting all failures of the counter and correcting as many of those failures as possible.

A known characteristic of a binary counter with a ripple carry, is that a transient error always results in the advancing of the count, while an error resulting from a hard failure of the counter, such as a stuck bit position, can cause both reduction and an increase in the count. Therefore, a ripple counter with the capability of distinguishing between transient and hard errors when they occur will be very desirable for the described application, since it would mean that all duplication in the assignment of virtual addresses to memory space could be eliminated by not using a count of the ripple counter when a hard error is detected. Furthermore, such a counter in which transient error could be corrected, would have the added advantage of being extremely efficient for the performance of its function.

BRIEF DESCRIPTION OF THE INVENTION

Therefore, in accordance with the present invention, a ripple carry counter is provided with means to detect errors, and distinguish between errors that are transient in nature and errors which result from hard failures of the counter. The counter has two channels each consisting of a binary counter with ripple carry. Both channels store the same binary number. The output of each stage in one counter is Exclusive Ored with the output of the same stage in the other counter. The results of this Exclusive Oring is analyzed with additional logic to determine if the counts in the two channels are or are not equal, and if they are not equal which of the counters contains the higher count. This information is then used to find which of the channels is in error and whether the error is a transient error or an error resulting from a hard failure in one of the channels.

Therefore it is an object of the present invention to provide a binary counter.

Another object of the invention is to provide a binary counter with transient error detection and correction.

It is a further object of the invention to provide a binary counter which can detect an error resulting in the reduction of the count.

Other objects of the invention are to provide an efficient binary counter; to provide a binary counter that corrects transient errors while detecting and distinguishing them from errors resulting from hard failures; and to provide a binary counter that detects any single error, determines whether it is a transient or hard error and then corrects those errors determined to be transient errors.

DESCRIPTION OF THE DRAWINGS

The foregoing and other objects, features and advantages of the present invention will be apparent from the following description of the preferred embodiment of the invention as illustrated in the accompanying drawings of which:

Referring now to FIG. 1, the counter has two channels, 10 and 12 of five stages each. As shown in FIG. 2, each stage constitutes a binary trigger made up of six AND-invert logic blocks 25 that form three interconnected bistable circuits. The inputs to this trigger circuit include a set input S, a reset input R, and a trigger input T. The outputs to this circuit are a true output Z and an inverted output $\overline{Z}$. Application of a pulse to the set inputs will cause the true output Z to go to 1 and the inverted output $\overline{Z}$ to go to 0. Application of a negative pulse to the reset input R when set input is positive will cause the true output Z to go to 0 and the inverted output $\overline{Z}$ to go to 1. With both the set and reset inputs positive, application of a positive pulse to the trigger input T will cause the outputs to reverse their present states. Therefore if Z is 1 and $\overline{Z}$ is 0 prior to a trigger pulse, after the application of the trigger pulse, Z will be 0 and $\overline{Z}$ will be 1. If Z is 0 and $\overline{Z}$ is 1 at the time of the application of the trigger pulse, the reverse will occur.

Figure 4:
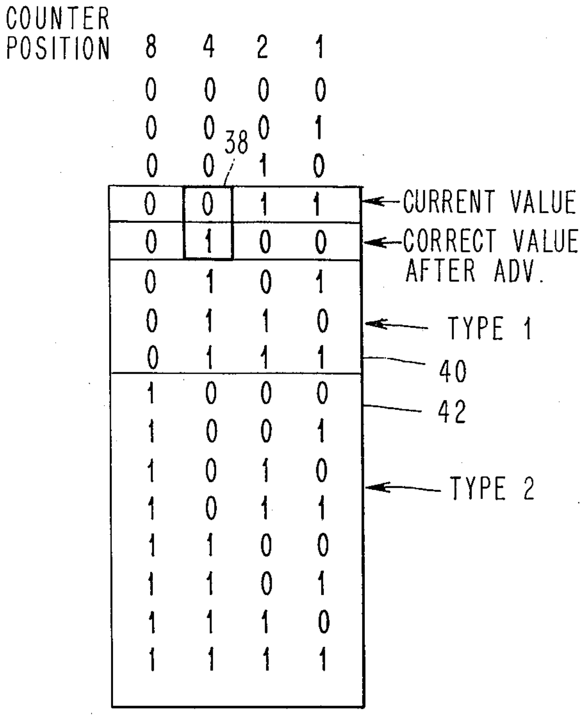
FIG. 4 is a table of the various counts possible with the counter shown in FIG. 1.

Referring back to FIG. 1, the first stage of each of the channels 10 and 12 has its trigger input T1 connected to receive an advance pulse A or B. Each succeeding stage 16 to 22 of each channel is connected to the inverted output of the preceding stage of that channel, so that the input T2 of trigger 16 receives the inverted output $\overline{Z}$ from trigger 14 and so on. This results the well known binary counter implementation wherein the first stage of each counter will change state each time a positive advanced pulse A or B is applied to its input T1. Each succeeding stage of each channel 10 will change state whenever the inverted output $\overline{Z}$ of the preceeding trigger in channel changes from 0 to 1. When the inverted output $\overline{Z}$ of any trigger of the counter is changed from 1 to 0, the stage next succeeding it will be unaffected by the change. Therefore if we go to FIG. 4, we can see how the output of each of the channels 10 and 12 taken at the true output Z of each of the triggers, will change as the channels are stepped in sequence through all possible states by the advance pulses applied to the first stage 14 of each of the channels 10 and 12. You will note that only four digits are accounted for in FIG. 4 while there are five triggers in each of the channels. The counter is in actuality a four digit counter with the true outputs Z of the first four triggers in the channel constituting the count of the counter. The output of the fifth trigger 22 in the channels does not constitute a digit of the count for the counter. When this fifth trigger 22 goes to 1 it means that the counter is full and an overflow condition has occurred. If the counter is to be reset, a wrap around counter can be used so that the output of the fifth trigger will automatically reset the counter to zero. If the counts are not to be repeated the output of the fifth trigger can be used to indicate that the counter has reached the end of its life.

Figure 1:
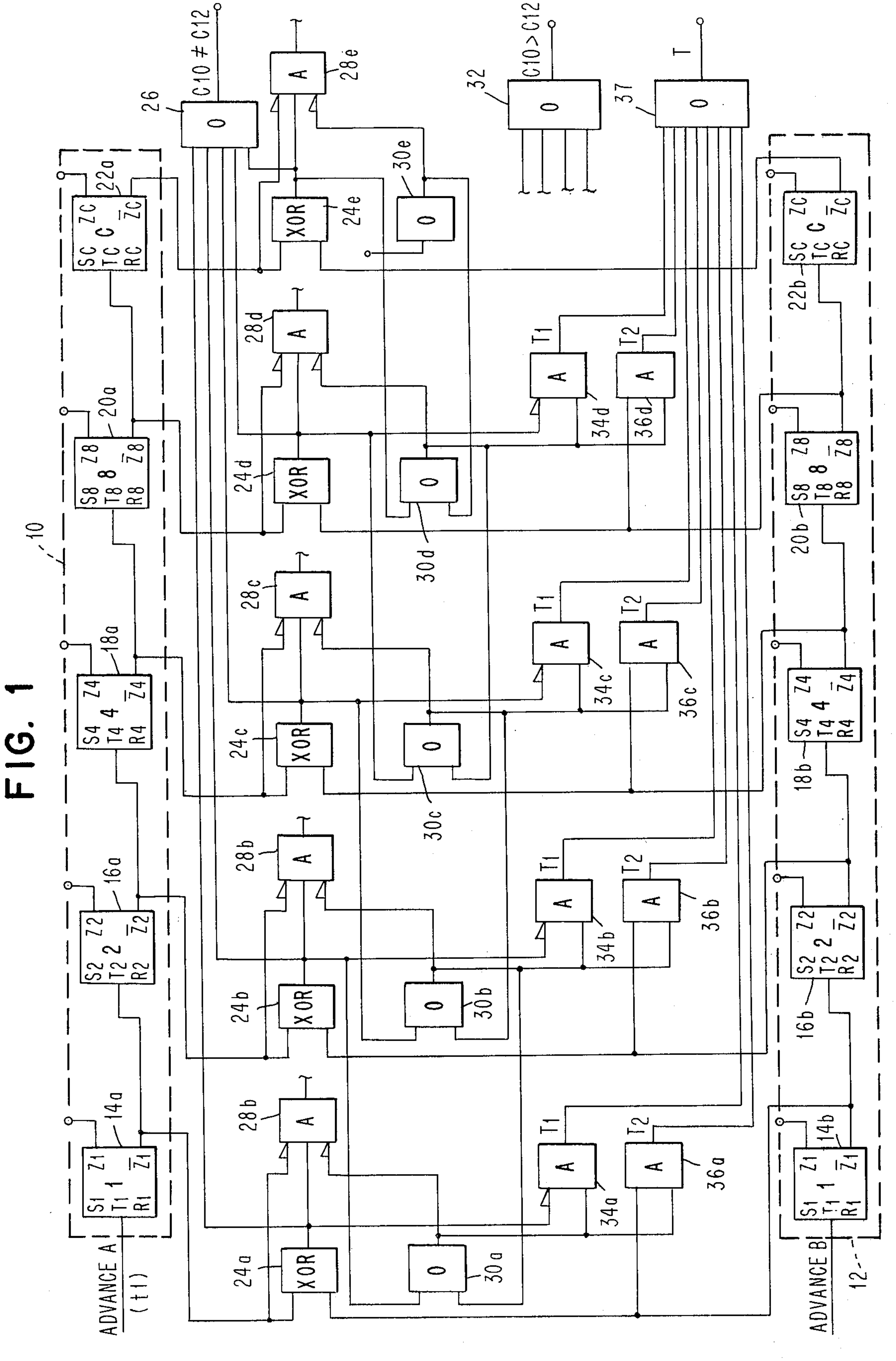
FIG. 1 is a logic diagram of the preferred embodiment of the invention.
Figure 2:
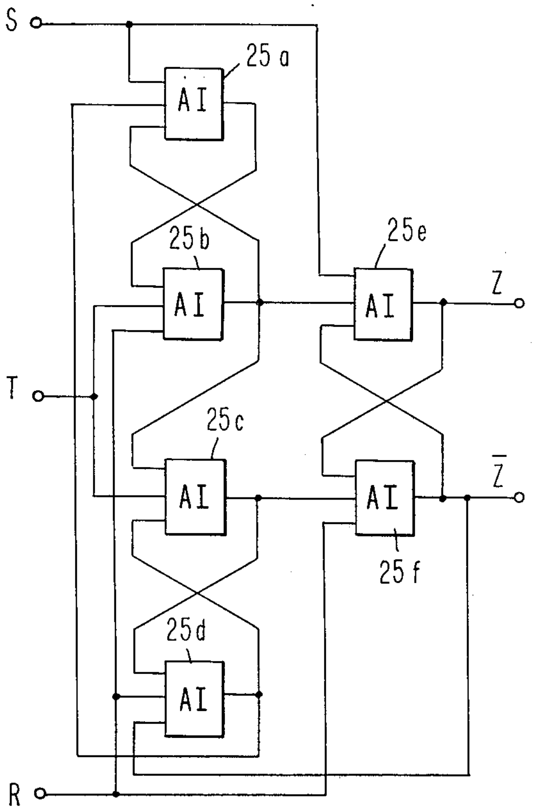
FIG. 2 is a trigger circuit employed in the embodiment of the invention shown in FIG. 1.

Positioned between the two channels 10 and 12 in FIG. 1 is the logic circuitry for detecting various types of errors. First there is an Exclusive OR circuit 24 connecting the inverted output of each stage in one channel 10 with the same stage in the other channel 12. The outputs of each of the Exclusive ORs 24 is fed into OR circuit 26. Thus if the output of any Exclusive OR circuit 24 is a binary 1 indicating a difference in value between the counts of any particular stage in the counter 10 and 12, the OR circuit 26 produces a binary 1 indicating that the counts of channels 10 and 12 do not agree.

Also associated with each stage of its two channels 10 and 12 is an AND circuit 28 which receives one input from the Exclusive OR circuit 24 associated with the same stage of the two channels, another input from the output Z of channel 10 of that stage and also the inverted output of an OR circuit 30 that effectively receives inputs from the outputs of all the Exclusive OR circuits 24 associated with all higher order stages of the counters. Thus before the AND circuit 28 for any stage is satisfied there must be a difference in count between the channels 10 and 12 at that stage, channel 10 must store a 1 in that stage and there must be no discrepencies between the two channels at any higher order stages. With this circuitry we will be able to determine if channel 10 contains a higher count than channel 12. Therefore with the outputs of OR circuits 26 and 32 we will be able to determine if the channels 10 and 12 differ in count, and if they differ whether the channel 10 or 12 contains the higher count.

With the above information we have mechanism for determining whether certain failures are transient since due to the nature of this binary counter any transient error will result in the counter advancing as opposed to falling back. To do this first store the same count in both channels 10 and 12 and continuously compare the outputs of the two channels 10 and 12 with the Exclusive OR circuitry 24. Then if a no compare signal is provided by the OR gate 26 transfer the contents of the channel storing the lower count into the channel storing the higher as determined by OR gate 32. Thereafter inhibit the read out of the counter until after the counter is next advanced by the application of advance pulses A and B. Immediately after the advance of the counter is complete, compare the counts of the two channels 10 and 12. If a difference is detected at the output of OR circuit 26, a hard error had occurred. If a compare exists at the output of OR circuit 26 a transient error had occurred and the output of the counter may be gated out and the operation of the counter continued, since the transient error has been corrected by the transfer data from one channel to the other.

It should be noted that the monitoring circuitry was not used during the advance time. This results in one disadvantage of the counter as so far described. That is, that transient errors occurring during advanced time are interpreted as hard errors. To overcome this disadvantage, two additional AND circuits 34 and 36 are associated with each position of the counter. The first of these AND circuits 34 ANDs the inverted output of the Exclusive OR circuit 24 associated with any given position of the counter with the output of any of the Exclusive OR circuits 24 associated with higher order positions of the counter as provided at the output of OR circuit. The second of the AND circuits 36 then compares the inverted output $\overline{Z}$ of any given position of channel 12 of the counter with the output of any of the Exclusive OR circuits 24 associated with higher order positions of the counter as provided at the output of OR circuit 30. Assuming that the channel 10 and thereafter channel 12 is advanced to change the count of the counter, this AND circuitry will distinguish between transient and hard errors occurring during the advance of the counter.

The circuitry is based on the well known fact that in the advance of a binary counter by a single step one and only one stage of the counter will make the transition from the 0 state to the 1 state. And that this stage corresponds to the stage storing the lowest order 0 state before the advance. If we look at FIG. 4 we can see that it is true for every possible advance in count of the described four place counter. Further analysis will show that this position will be the digit in the counter containing the highest order difference between the count prior to and after a proper advance.

As an example, let us take an advance of the count of the counter from the binary number 3 to the binary 4. As shown by block 38 in FIG. 4, counter position 4 is the position which changes from 0 to 1. It also stores the lowest order 0 state prior to the change and it contains the high order difference between the counters original contents and the contents after advance. Where channel 10 has been advanced and channel 12 has yet to be advanced, the above would be true of the outputs of the two channels if channel 10 had properly advanced. However a number of errors may occur. If it were a transient error in channel 10 the count of channel 10 could advance more than one step due to the accidental occurrence of more than one advance pulse or the occurrence of a transient pulse. When either one of these transient errors occur, channel 12 will still store the number 3 while channel 10 will have been advanced to one of the numbers other than the next succeeding number in the sequence shown in FIG. 4.

All succeeding numbers in the sequence fall into one of two categories defined herein as type I and type II. If the advance is a type I advance or in other words an advance to one of the numbers surrounded by box 40 in FIG. 4, the count in channel 10 will be distinguished from the count in channel 12 in that the low order 0 in channel 10 will change state and at least one position of channel 10 of lower order than the position that changed state will match the contents of the counter prior to the advance. AND gates 34 check for such a change in status between the columns 10 and 12. They provide an output T1 that is fed into OR gate 37 to produce a 1 at the output of OR gate 37 when a case 1 advance occurs.

Now suppose that the advance was not to one of the numbers surrounded by box 40 but was an advance to one of the numbers surrounded by box 42. Numbers falling within box 42 or type II numbers can be distinguished on the basis that channel 12 will store a 0 state in a stage which is of lower order than the stage containing the high order difference between channels 10 and 12. Case II advances are detected by AND gates 36 which then provide an output T2 that is fed into OR gate 37 to produce a 1 at the output of OR gate 37.

We now have the tools with which to correct transient errors occurring during the advance of the counter and to distinguish such transient errors from hard errors. Let us again assume that channels 10 and 12 both initially store the same number and channel 10 is advanced first. If after the advance the count in channel 10 equals the count in channel 12 or if they are not equal, but the count of channel 12 is greater than the count of channel 10, it is very likely that a hard error has occurred. The counter should be shut down from further operation. If on the otherhand channel 10 has advanced so that its count is greater than the count of channel 12, the following steps should be taken depending on whether or not OR gate 37 provides a 1 output.

Step 1 — If $C10 > C12$ and $T = 1$ go to step 2. If $C10 > C12$ and $T \neq 1$ go to step 3.

Step 2 — Transfer the contents of channel 12 to channel 10 and go back to step 1.

Step 3 — Advance channel 12 and then: if $C10 > C12$ go to step 5. if $C10 \neq C12$ and $C10 \not> C12$ go to step 4. if $C10 = C12$ counter has advanced properly and advancing of counter is complete.

Step 4 — Transfer contents of channel 10 to channel 12 and: if $C10 = C12$ advance phase complete. if $C10 \neq C12$ go to step 5.

Step 5 — Shut down counter a hard error has occurred in channel 12.

Figure 3:
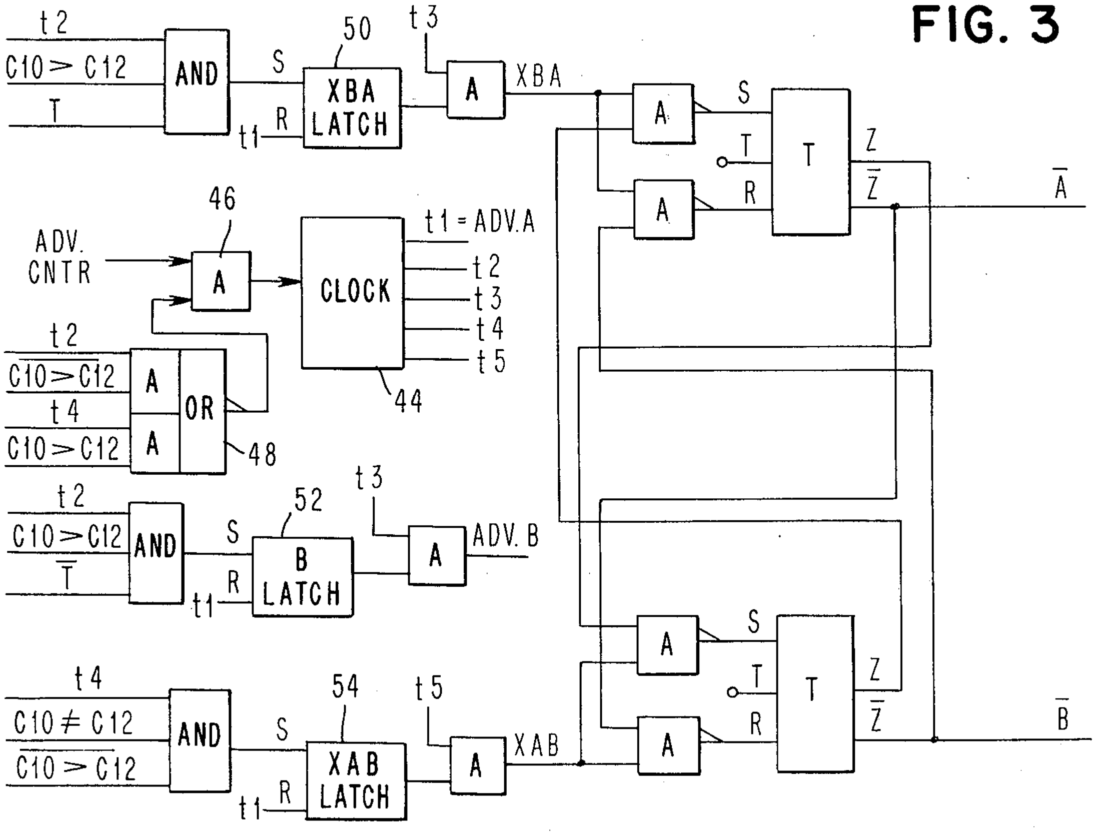
FIG. 3 is a circuitry for correcting transient errors occurring in the embodiment shown in FIG. 1.

The circuitry for performing the functions described above is found in FIG. 3. The clock pulse generator 44 produces 5 clock pulses $t_1$ to $t_5$ on the occurrence of a counter advance pulse and in absence of an inhibit pulse to AND gate 46 by AND-OR gates 48. These clock pulses occur one after the other in non-overlapping fashion in the order in which they are numbered and each is of sufficient duration to permit the completion of logic ripple and the setting of the appropriate latches. The clock pulses are used above and in combination with the outputs of OR gates 26, 32 and 37 in performing the functions. For instance, clock pulse $t_1$ is used to advance channel 10 and to reset the transfer B to A latch 50, the B latch 52 and the transfer A to B latch 54. The clock pulses $T_2$ and $t_3$ are used in combination with the outputs $C10 > C12$ and T of OR gates 32 and 37 to generate the pulse XBA to transfer the contents of channel 12 to channel 10. The clock pulses $t_4$ and $t_5$ are used in combination with outputs $C10 \neq C12$ and $\overline{C10 > C12}$ of OR gates 26 and 37 to generate the pulse XAB to transfer the contents of channel 10 to channel 12. The clock pulses $t_2$ and $t_3$ are used in combination with the outputs $C10 > C12$ and $\overline{T}$ of OR gates 32 and 37 to generate the pulse for advancing channel 12 and clock pulses $t_2$ and $t_4$ of used in combination with outputs $C10 > C12$ and $C10 > C12$ of OR gate 32 to inhibit the clock pulse generator 44 when a bad error occurs.

The described counter is one embodiment of the present invention. Numerous changes can be made in that embodiment without departing from the spirit and scope of the invention. For instance the circuitry associated with the AND gates 34 and 36 could be eliminated and channels 10 and 12 simultaneously advanced with one advance pulse. In such a counter all errors occurring during advance would have to be treated as hard errors, therefore certain advantages of the invention as embodied in FIG. 1 would be lost, however if simplicity is a requiste these changes may be desirable.

Therefore, while the invention has been particularly shown and described with reference to preferred embodiments thereof, it will be understood by those skilled in the art that the foregoing and other changes in form and details may be made therein without departing from the spirit and scope of the invention.

What is claimed is:

1. A method for correcting an error in a count that occurs as a result of a transient error as opposed to a solid error comprising the steps of:

a. producing signals for storing the same count in two counters with ripple carry;

b. comparing the count stored in both counters after both counters have been advanced to store the count by the produced signals;

c. transferring the lower count into the counter with ripple carry containing the higher count while maintaining the lower count in the counter with ripple carry containing the lower count when the comparison made in step (b) indicates that the counts in the two counters are different; and d. comparing the count in the counters with ripple carry after the transfer to determine if they are equal.

2. A counter capable of correcting transient errors as opposed to errors resulting from a hard failure comprising;

a. two channels each comprising a separate n stage counter with ripple carry for storing a desired count in duplicate;

b. logic means coupled to the two n stage counters for determining if the count of one n stage counter is equal to or greater than the count in the other n stage counter; and c. transfer means coupled to the two counters and the logic means for attempting to replace the count in the counter with the higher count with the count in the counter with the lower count when the logic means determines that the count of the two n stage counters differ whereby a determination by the logic means that the counts are equal after the transfer indicates that the difference between the counts in the two n place counters was the result of a transient error.

3. The counter of claim 2 including advancing means coupled to the inputs of the two *n* stage counters for producing a signal to first advance the count in said one *n* place counter and thereafter producing a signal to advance the count in said other *n* place counter and additional logic means coupled to said logic means for determining if the one counter advanced more than one count over the count stored in the other counter.

4. The counter of claim 3 including means coupled to said logic means for indicating a hard error when the counts are equal or the count of said one counter is less than the count of said other counter after said one counter has been advanced and said other counter has yet to be advanced.

5. The counter of claim 2 wherein said logic means includes Exclusive OR circuit means coupled to each stage of said n stage counters for comparing the output of each stage of the one n stage counter with the same stage of the other n stage counter to determine if the counts in the two counters are equal; and circuit means coupled to each stage of said n stage counters and to said Exclusive OR circuit means for determining when the count in said one *n* stage counter is higher than the count in said other *n* stage counter.

* * * * *